United States Patent Office 3,557,202
Patented Jan. 19, 1971

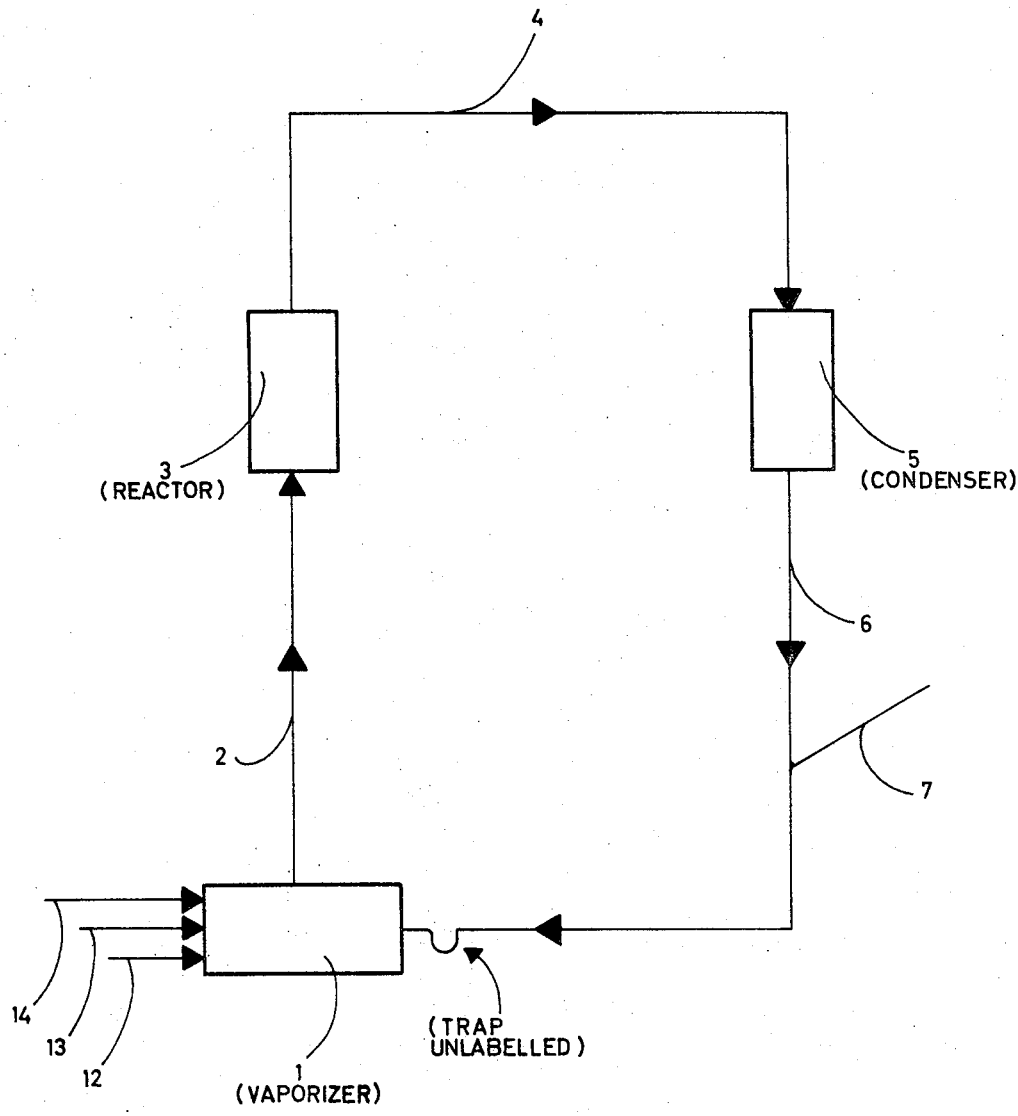

3,557,202
HALOVINYLPHOSPHONOUS DIHALIDES AND A PROCESS FOR THE PREPARATION THEREOF
Walter Stamm, Tarrytown, N.Y., and Eugene H. Uhing, Ridgewood, N.J., assignors to Stauffer Chemical Company, New York, N.Y., a corporation of Delaware
Filed Jan. 3, 1967, Ser. No. 607,051
Int. Cl. C07f 9/52
U.S. Cl. 260—543                                                 7 Claims

ABSTRACT OF THE DISCLOSURE

Novel halovinylphosphonous dihalides of the formula:

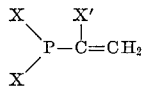

wherein X is a halogen atom having an atomic weight greater than about 30, and X' is a halogen atom having an atomic weight greater than about 15; a novel process for their preparation by the reaction of a phosphorus trihalide and a vinyl halide at a temperature between about 200° C. and 800° C. in a non-oxidizing medium; polymers incorporating the halovinylphosphonous dihalides and derivatives obtained therefrom.

---

The high temperature reaction between a phosphorus trihalide and a hydrocarbon is not new. Michaelis, as early as 1873, reported the preparation of phenyl phosphonous dichloride from benzene and phosphorus trichloride; Ber., 6, 601 (1873). Later methane and ethane phosphonous dichloride were prepared by the high temperature reaction of phosphorus trichloride with methane and ethane respectively; J. Am. Chem. Soc., 84, 851 (1962).

To this time, notwithstanding this early beginning however, no high temperature vapor phase reactions have been reported between phosphorus trihalides and olefinic hydrocarbons.

It has now been discovered that a direct reaction will occur between phosphorus trihalides and vinyl halides and, accordingly, it is an object of this invention to provide new compositions of matter and a novel process for their preparation.

A further object is to provide polymers incorporating halovinylphosphonous dihalides as well as derivatives thereof.

Other objects will be apparent from the detailed description which follows.

By the process of the invention, halovinylphosphonous dihalides are prepared by vaporizing the phosphorus trihalide and vinyl halide reactants and subjecting their vapors to a pyrolyzing temperature for a brief period. The pyrolysis products are then separated by fractional condensation or distillation.

A typical flow diagram for the preparation of halovinylphosphonous dihalides is illustrated by the figure. The process can be carried out with reference to the illustrated diagram, as follows:

A quantity of an inert gas is introduced through conduit 13 to vaporizer 1 to rid the system of oxygen as the reaction must be conducted in a non-oxidizing medium. A quantity of vinyl halide is then introduced through conduit 12 and a quantity of phosphorus trihalide is introduced through conduit 14 into vaporizer 1. The mixture is brought to a refluxing temperature whereupon the vapors pass through conduit 2 into reactor 3. There they are heated to a temperature sufficient to effect pyrolysis.

The emitted vapors are then passed through conduit 4 to condenser 5. The condensate comprising halovinylphosphonous dihalide reaction product, starting materials and by-products is passed through conduit 6 and returned to vaporizer 1. The gaseous vapors leaving condenser 5, comprising primarily hydrogen chloride, are passed through conduit 7 to be recovered or discarded. Halovinylphosphonous dihalide product can then be drained off from vaporizer 1 or the reaction can be terminated in order to recover the product, which can be purified, if desired, by fractional distillation or other conventional means.

The temperature of the reaction is not critical within the limits established but is generally maintained between about 200° C. and 800° C. and preferably between about 400° C. and 650° C. depending on the nature of the reactants employed. For example, with phosphorus trichloride and vinyl chloride it is preferred to maintain the temperature of the reaction between about 550° C. and about 600° C. in order to have a reasonably fast reaction without excessive decomposition. It is preferred to use an excess of phosphorus trihalide which serves as a reaction medium and may also inhibit the polymerization of the vinyl halide. The reaction is conducted under non-oxidizing conditions such as in the presence of a dry inert gas such as nitrogen.

The following example will serve to illustrate the process.

EXAMPLE 1

To a 3-necked 500 milliliter reaction flask contained in a heating mantle and fitted with a 1 inch diameter Vycor tube having a sliding thermocouple inserted therein, said Vycor tube contained within a 12 inch electric furnace, is charged 300 grams of phosphorus trichloride. Vinyl chloride is then added at a rate of 13 cubic centimeters per minute, and the flask is heated until the phosphorus trichloride and vinyl chloride reactants are vaporized and passed into the Vycor tube. The temperature inside the Vycor tube is adjusted to 600° C. and product formation takes place. The reaction is conducted continuously for 18 hours under nitrogen, as hereinabove described. Chlorovinylphosphonous dichloride is produced at the rate of 0.5 gram per hour. Recovery of the chlorovinylphosphonous dichloride is accomplished by fractionating the reaction mixture to yield a product having an analysis of 43.9% ionic Cl and 18.2% P as compared to 43.6% ionic Cl and 19.0% P theoretical. The NMR spectra indicate the product to be 1-chlorovinylphosphonous dichloride. The boiling point of chlorovinylphosphonous dichloride is found to be 140–142° C.

Halovinylphosphonous dihalides are ideally suited for the preparation of a number of useful compolymers and pesticides. For example, an alkylene epoxide such as ethylene oxide, propylene oxide, butylene oxide, styrene epoxide and the like will react with halovinylphosphonous dihalides in a molar ratio of 2:1 to form an ester of the following formula:

wherein X is a halogen atom having an atomic weight greater than about 30, X' is a halogen atom having an atomic weight greater than about 15, $n$ is an integer of from 1 to 2 inclusive, $n'$ is an integer of from 0 to 1, and R is a hydrocarbon of from 1 to 6 carbon atoms inclusive, with the provision that when $n$ is 2, $n'$ is 0. This ester can then be copolymerized with an unsaturated olefinic compound containing the $>C=C<$ radical (hereinafter olefin), or it can be rearranged by heat, for example, to form a phosphinate of the general formula:

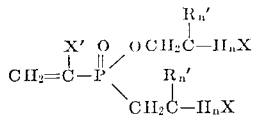

wherein X, X', n, n' and R are as previously defined, and this phosphinate can also be copolymerized with an olefin.

A monomer suitable for highly crosslinked polymers can be prepared by reacting this product (when $n'=0$) in the presence of an alkali metal salt of a weak acid or a weak base in a molar ratio of 1:1 to produce a monomer of the general formula:

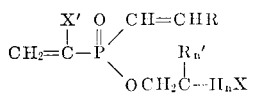

wherein X, X', n, n' and R are as previously defined.

Other useful monomers can be prepared by reacting one mole of halovinylphosphonous dihalide with two moles of alcohol to produce phosphinates of the general formula:

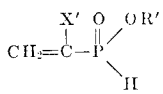

wherein R' is an aliphatic hydrocarbon of from 1 to 20 carbon atoms and X' is as previously defined. The phosphinate above can then be copolymerized with an olefin or reacted with an aldehyde or ketone in a molar ratio of 1:1 to produce a phosphinate of the following general formula:

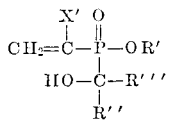

wherein X' and R' are as previously defined and R'' and R''' are hydrocarbons of from 1 to 20 carbons, or hydrogen.

Halovinylphosphonates are particularly useful as crosslinking agents, alone or in combination with other known crosslinking agents. For example, dimethyl chlorovinylphosphonate can be mixed with styrene, or chlorostyrene in, for example, a ratio of 1:9, and then blended into unsaturated polyesters such as those obtained from maleic anhydride and glycols. Such clear, liquid blends are transformed to hard, resinous masses by activation with free radical producing catalysts, such as organic peroxides. Polyesters crosslinked in the above described manner show a high degree of flame resistance due to the unusually effective combination of phosphorus with chlorine. Excellent results are also achieved with 1-bromovinylphosphonate esters.

Other useful reactions of halovinylphosphorus dihalides include their conversion to relatively stable cyclic compounds, as follows:

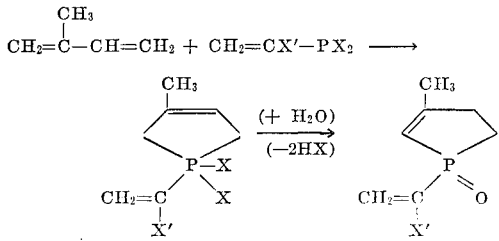

wherein X and X' are as previously defined.

Still other useful conversions include the reaction of halovinylphosphorus dihalides with aromatics such as, for example, benzene, as follows:

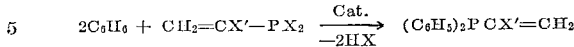

wherein X and X' are as previously defined.

Useful pesticides can be prepared by oxidizing the halovinylphosphonous dihalide to the halovinylphosphonic dihalide or its thio derivative and reacting the resultant pentavalent phosphorus compound with a compound having an active hydrogen atom such as, for example, thiophenols or alkyl mercaptans. Illustrative of pesticides which can be prepared in U.S. Pat. No. 2,988,474.

Representative compounds which can be reacted with halovinylphosphonous dihalides include the following monomers. Vinyl compounds to include vinyl esters, such as vinyl acetate, vinyl butyrate, vinyl O-chlorobenzoate, vinyl diethylacetate, vinyl laurate, vinyl methacrylate, vinyl octyl phthalate, vinyl oleate, vinyl palmitate, vinyl phenylacetate, vinyl p-phenylbenzoate, vinyl stearate, and vinyl 3,5,5-trimethylhexanoate; vinyl ethers, such as vinyl methyl ether and vinyl isobutyl ether; acrylic compounds, such as acrylic acid, acryloyl chloride, sodium acrylate, methyl acrylate, ethyl acrylate, ethyl methacrylate, butyl methacrylate, acrylonitrile, acrylamide; polybasic compounds such as maleic acid, fumaric acid, maleic anhydride, succinic anhydride, isophthalic acid, pyromellitic anhydride, trimethylolpropane, ethylene glycol, diethylene glycol, triethylene glycol, sorbitol, mannitol, pentaerythritol; mono functional compounds, such as ethanol, propanol, butanol, phenol, 1-phenyl phenol, cresols, ethyl phenol, and octyl phenol, acid aldehyde, propionyl aldehyde, acetone, butyraldehyde, and methyl ethyl ketone. Other compounds include olefins, such as ethylene, propylene, butylene; substituted olefins, such as vinylcyclohexene, and styrene.

The conventional polymerization methods commonly applied to pure monomers may be employed and particularly the more common techniques as exemplified by bulk, solution, suspension and emulsion polymerization. The properties of the particular polymer will, of course, depend upon which monomer is copolymerized with the particular compound of the invention, but generally the resulting polymers will be characterized by having self-extinguishing flame properties which make them useful for wearing apparel, blankets, carpets, automotive materials, as well as for rigid construction materials, furniture, etc.

If desired, initiators or catalysts can be employed. Representative examples include the free radical catalysts, such as heat, light and particularly ultraviolet light; peroxides, such as acetyl-peroxide, or benzoyl-peroxide; hydroperoxides, such as cumene hydroperoxide, and azo compounds such as 2,2'-bisazoisobutyronitrile. Other catalysts include Friedel-Crafts-type catalysts, such as boron trifluoride, aluminum chloride, stannic chloride, and aluminum bromide; carbanion-type catalysts, such as water, alcohols or amines, and Ziegler-type catalysts, such as the combination of a trialkyl boron, trialkyl aluminum, aluminum sesqui halides and a titanium halide.

The copolymerization can be carried out at a temperature between about $-20°$ C. and about $200°$ C. and at atmospheric or superatmospheric pressures. Lower and higher temperatures and pressures, however, can be employed but the temperature will generally lie between about $0°$ C. and $100°$ C., and the pressure between about 1 and 10 atmospheres.

The polymerization is preferably conducted in the presence of a non-reactive medium, such as benzene, chlorobenzene, carbon disulfide, methylene chloride, carbon tetrachloride, and the like. The mixture should be free of compounds containing hydroxy groups, such as alcohols, carboxylic acids, and water.

The vinylphosphorus monomer may comprise up to about 95% of the polymer, but preferably the phosphorus compound will constitute the minor proportion since it is most often the more costly of the materials; generally from about 1 to about 20% based on the weight of the total monomer is preferred.

For convenience the invention is illustrated with vinyl chloride and phosphorus trichloride but the other halide reactants, i.e., vinyl bromide, vinyl fluoride, vinyl iodide, phosphorus triiodide and phosphorus tribromide are interchangeable with the illustrated reactants.

EXAMPLE 2

Preparation of O,O-dichloroethyl chlorovinyl-phosphonite

To a 100 milliliter flask flushed with nitrogen is placed 16.3 grams (0.1 mole) of chlorovinylphosphonous dichloride. The flask is cooled to −5° C. by means of a salt-ice bath and 9.6 grams (0.2 mole plus 10% excess) of gaseous ethylene oxide is bubbled into the flask while maintaining the temperature of the reaction between −5° C. and 0° C. The reaction mixture is then heated to 40° C. and maintained at this temperature for one-half hour. The reaction mixture is then stripped under reduced pressure to recover 25.1 grams of O,O-dichloroethyl chlorovinylphosphonite of the structural formula:

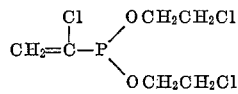

EXAMPLE 3

Preparation of O-chloroethyl choroethyl chlorovinylphosphinate

To a 100 milliliter closed flask flushed with nitrogen is placed 25.1 grams (0.1 mole) of the product of Example 1 and said product is heated to 120° C. when an exothermic reaction is observed. The reaction is maintained at a temperature between 120° C. and 140° C. for a period of three hours. The product is then distilled under 1 millimeter of mercury pressure to produce 23.1 grams (92% yield) of O-chloroethyl chloroethyl chlorovinylphosphinate of the structural formula:

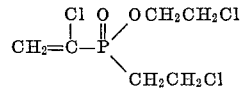

EXAMPLE 4

Preparation of O-chloroethyl vinyl chlorovinyl phosphinate

To a 100 milliliter flask flushed with nitrogen is added 23.1 grams (0.092 mole) of the product of Example 3 and 8.2 grams (0.1 mole) of sodium acetate. The mixture is heated to 120° C. and maintained at that temperature for two hours. The reaction is then allowed to cool to room temperature and the sodium chloride by-product is removed by filtration. The product is further purified by distillation at 1 millimeter mercury pressure to produce 16.5 grams (85% yield) of O-chloroethyl vinyl chlorovinylphosphinate of the structural formula:

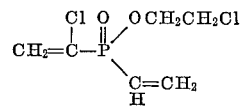

EXAMPLE 5

Preparation of chlorovinylphosphinic acid

To a 100 milliliter flask suspended in an ice-water bath and containing 50 milliliters of 37% hydrochloric acid is slowly added 16.3 grams (0.1 mole) of chlorovinylphosphonous dichloride while maintaining the temperature of the mixture between 20° C. and 40° C. The solvent is then stripped off to produce 12.6 grams of chlorovinylphosphinic acid, $n_D^{25}=1.4950$, of the structural formula:

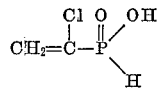

EXAMPLE 6

Preparation of hydroxymethyl chlorovinylphosphinic acid

To a 100 milliliter flask containing a solution of 10 grams of water and 10 grams of 37% aqueous formaldehyde is added 12.6 grams (0.1 mole) of chlorovinylphosphinic acid. The reaction is heated to a refluxing temperature and maintained at that temperature for eight hours under a nitrogen atmosphere. The solvent is then removed under reduced pressure to produce 15 grams (96% yield) of hydroxymethyl chlorovinylphosphinic acid of the structural formula:

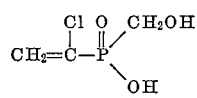

EXAMPLE 7

Preparation of O-chloroethyl chloroethyl chlorovinylphosphinate-styrene copolymer To a 2-ounce glass jar are added 3 grams of the reaction product of Example 3, 10 grams of styrene, and 0.1 gram of benzoylperoxide. The mixture is then heated under nitrogen to a temperature of 70° C. and maintained at that temperature for six hours. The mixture is then allowed to cool to room temperature and the clear, solid polymeric material formed is self-extinguishing after having been held in a flame for five seconds and removed.

EXAMPLE 8

Preparation of O-chloroethyl vinyl chlorovinyl-phosphinate-methyl acrylate copolymer To a 2-ounce glass jar are added 3 grams of the reaction product of Example 4, 10 grams of methyl acrylate, and 0.1 gram of benzoyl-peroxide. The jar is flushed with nitrogen and capped. The mixture is then heated to a temperature of 70° C. and maintained at that temperature for six hours. After allowing the mixture to cool to room temperature, a clear polymeric material is recovered which when held in a flame for five seconds and removed is self-extinguishing.

EXAMPLE 9

To a 100 milliliter flask are added 15.6 grams (0.1 mole) of the reaction product of Example 6, 14.0 grams (0.1 mole) of triethylene glycol, and 9.8 grams (0.1 mole) of maleic anhydride. The mixture is heated to a temperature of 160° C. and maintained between 160 and 180° C. for four hours under a nitrogen atmosphere. The reaction product is then converted to a clear alkyl resin by crosslinking said reaction product with 5.2 grams (0.05 mole) of styrene and 0.1 gram of benzoyl-peroxide. The resultant resin is found to be self-extinguishing when held under a flame for five seconds and removed.

EXAMPLE 10

To a 100 milliliter flask are added 6.8 grams (0.1 mole) of isoprene (2-methyl butadiene), 16.3 grams (0.1 mole) of chlorovinylphosphonous dichloride. The flask is flushed with nitrogen, sealed and maintained at room temperature for ten days. The mixture is distilled under reduced pressure to recover a compound of the following formula:

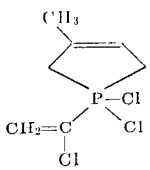

which when treated with water is hydrolyzed to the following compound:

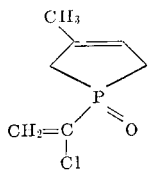

What is claimed is:
1. A novel halovinylphosphonous dihalide of the formula:

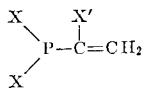

wherein X is a halogen atom having an atomic weight greater than 30, and X' is a halogen atom having an atomic weight greater than 15.

2. The compound of claim 1 wherein X and X' are chlorine.

3. A process for preparing halovinylphosphonous dihalides which comprises reacting, in the vapor phase, a phosphorus trihalide and a vinyl halide at a temperature between about 200° C. and 800° C. in a non-oxidizing medium, and recovering the halovinylphosphonous dihalide product.

4. The process of claim 3 wherein the phosphorus trihalide and vinyl halide reactants are present in a molar ratio of at least about 1:1.

5. The process of claim 3 wherein the halovinylphosphonous dihalide is chlorovinylphosphonous dichloride.

6. The process of claim 3 wherein the phosphorus trihalide is phosphorus trichloride.

7. The process of claim 3 wherein the halovinylphosphonous dihalide is chlorovinylphosphonous dichloride, the phosphorus trihalide is phosphorus trichloride, and the temperature of the reaction is maintained between about 400° C. and 650° C.

References Cited

UNITED STATES PATENTS 3,210,418  10/1965  Pianfetti _____ 260—543

OTHER REFERENCES

Soviet Inventions Illustrated, March 1966, No. 172,322 (U.S.S.R. abstract of patent).

LORRAINE A. WEINBERGER, Primary Examiner

E. J. GLEIMAN, Assistant Examiner

U.S. Cl. X.R.

260—78.5, 80.71, 86.1, 88.1, 502.4, 606.5, 953, 956